(12) United States Patent
Chand et al.

(10) Patent No.: US 8,756,219 B2
(45) Date of Patent: Jun. 17, 2014

(54) RELEVANT NAVIGATION WITH DEEP LINKS INTO QUERY

(75) Inventors: Rajeev Chand, Redmond, WA (US); Peter Bailey, Kirkland, WA (US); Toan Huynh, Redmond, WA (US); Deana Fuller, Seattle, WA (US); Zachary Gutt, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 635 days.

(21) Appl. No.: 12/264,786

(22) Filed: Nov. 4, 2008

(65) Prior Publication Data

US 2010/0114908 A1 May 6, 2010

(51) Int. Cl.
G06F 17/30 (2006.01)
(52) U.S. Cl.
USPC .......................................... 707/721
(58) Field of Classification Search
USPC .......................................... 707/721
See application file for complete search history.

(56) References Cited

U.S. PATENT DOCUMENTS

| | | | |
|---|---|---|---|
| 7,152,064 B2 * | 12/2006 | Bourdoncle et al. .................. 1/1 |
| 7,890,499 B1 * | 2/2011 | Boswell ........................ 707/722 |
| 8,140,524 B1 * | 3/2012 | Bailey et al. .................. 707/721 |
| 2005/0149576 A1 | 7/2005 | Marmaros |
| 2006/0074870 A1 | 4/2006 | Brill |
| 2006/0116986 A1 * | 6/2006 | Radcliffe ......................... 707/3 |
| 2006/0190440 A1 | 8/2006 | Horvitz |
| 2006/0235838 A1 | 10/2006 | Shan |
| 2007/0061283 A1 | 3/2007 | Lakhotia |
| 2007/0198503 A1 * | 8/2007 | Hogue et al. ..................... 707/5 |
| 2007/0198741 A1 | 8/2007 | Duffy |
| 2007/0239692 A1 * | 10/2007 | McBride ........................... 707/3 |
| 2008/0071744 A1 | 3/2008 | Yom-Tov |
| 2008/0077609 A1 | 3/2008 | Ronen |
| 2008/0104042 A1 | 5/2008 | Gutt |
| 2008/0114743 A1 * | 5/2008 | Venkataraman et al. ......... 707/3 |
| 2008/0133510 A1 | 6/2008 | Timmons |
| 2008/0183685 A1 * | 7/2008 | He et al. ........................... 707/4 |
| 2008/0189269 A1 | 8/2008 | Olsen |
| 2009/0150827 A1 * | 6/2009 | Meyer et al. .................. 715/810 |
| 2009/0182729 A1 * | 7/2009 | Lu et al. ........................... 707/5 |

OTHER PUBLICATIONS

Karen Church, Mark T. Keane and Barry Smyth The First Click is the Deepest: Assessing Information Scent Predictions for a Personalized Search Engine http://www.easy-hub.org/hub/workshops/ah2004/doc/papers/Church_Keane_and_Smyth.pdf, 2004, The Netherlands.

Zhiyuan Chen and Tao Li Addressing Diverse User Preferences in SQL-Query-Result Navigation http://delivery.acm.org/10.1145/1250000/1247551/p641-chen.pdf?key1=1247551&key2=3921368121&coll=GUIDE&dl=&CFID=81791409&CFTOKEN=30838613, 2007, ACM Digital Library.

* cited by examiner

Primary Examiner — Rehana Perveen
Assistant Examiner — Alexander Khong
(74) Attorney, Agent, or Firm — Dave Ream; Doug Barker; Micky Minhas (57) ABSTRACT

Methods and computer-readable media for determining relevant search categories, such as images, videos, news, health, maps, products, etc., and subcategories that are associated with the search categories based on a query submitted by a user on a search page and displaying the relevant search categories and subcategories on an initial search results page. A query may be inputted by a user and may be received. A set of suggested refinement links, which may include search categories and subcategories, may be identified as being relevant to the query. Further, the subcategories, when selected, may return narrower search results than when a selection is made of a search category. Additionally, the initial search results page may be generated and may include the set of suggested refinement links determined to be relevant to the query, as well as search results.

16 Claims, 10 Drawing Sheets

RELEVANT NAVIGATION WITH DEEP LINKS INTO QUERY

BACKGROUND

A user typically makes several selections in order to navigate from a general search page, or one that provides a broad-based search, to a page that displays search results that have been refined to a point such that the user may easily find what he or she is searching for. For example, a user may begin on a general search page, but may be searching for images of Michael Jordon that are a certain size, or a certain color, such as black and white photos. Alternatively, a user may be searching for certain products associated with Michael Jordon. To arrive at a page having these refined search results, a user may have to make several selections on several web pages, such as an initial selection of an images link, and likely a second selection of a size link, and then a selection of a medium size link to arrive at images of a medium size of Michael Jordon. This not only takes a user's time, and thus is inefficient, but may also be confusing to the user to search so many web pages to find the appropriate link that may refine the search results in the appropriate manner.

SUMMARY

Embodiments of the present invention relate to methods and media for determining search categories, such as images, videos, health, news, maps, products, etc., and associated subcategories that are most relevant to a particular query submitted by a user. In some embodiments, a database may be accessed to locate a stored query that, in a normalized format, is the same or similar to the user submitted query after it has also been normalized. A set of suggested refinement links, which may include search categories and subcategories, may then be identified as being associated with the stored query, and therefore relevant to the user submitted query. The search categories and subcategories may have been algorithmically determined to be relevant to the stored query using a variety of methods, such as, for example, a frequency of previous users selecting particular search categories or subcategories in relation to the query, or a probability that a user will select particular search categories or subcategories, also in relation to the query. Once identified, this set of suggested refinement links, as well as search results, may be sent for display on a user's display device on an initial search results page such that the user may select a relevant search category or subcategory while still on the initial search results page.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Embodiments of the present invention are described in detail below with reference to the attached drawing figures, wherein.

DETAILED DESCRIPTION

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Embodiments of the present invention relate to methods and computer-readable media for determining relevant search categories and subcategories to return to a user upon receiving a user submitted query. Search categories are verticals, and are typically based on topicality or information type such as, but not limited to, images, videos, news, maps, health, local, products, etc. Subcategories are associated with a particular search category, and therefore represent a refined area of a search category. Examples of subcategories of images may be, for example, black and white photos, color photos, face only images, images of a certain size, images of a certain aspect ratio, etc. Examples of subcategories of health may be, for example, conditions, personal health, drugs and substances, alternative medicine, and procedures. The search categories and subcategories may be determined to be relevant by accessing a database to identify a stored query that is most similar to the user submitted query, and identifying search categories and subcategories, collectively termed a set of suggested refinement links, that are associated with the stored query.

The set of suggested refinement links, in one embodiment, have been algorithmically determined to be relevant to the stored query, and therefore may also be relevant to the user inputted query. This relevancy may be determined in many ways. In one instance, relevance may be determined by computing the frequency of previous users selecting particular search categories and subcategories in relation to a certain query. In another instance, a probability factor may be utilized to determine a probability of a user selecting particular search categories and subcategories in relation to a certain query. Once the set of suggested refinement links has been identified, an initial search results page is generated, and includes the relevant search categories and subcategories, as well as search results. An initial search results page is a web page having one or more search results that have been returned or displayed as a result of a user submitted query, and is the first web page having search results that is displayed to a user after the user has submitted the query. In some instances, more than one search results page may be sequentially displayed having search results. For example, after an initial search results page is displayed, a user may choose to refine the search by selecting an option, such as images, videos, etc. Thereafter, another search results page may be displayed, but this would not be the initial search results page.

In some embodiments, more than one stored query may be identified as being most similar to the query submitted by the user. In these instances, as each stored query may have an associated set of refinement links, these sets of refinement links may be analyzed so that a subset of the search categories and subcategories contained in the sets of refinement links may be selected or identified as being the most relevant to the query, and as such may be presented to the user on an initial search results page. For example, if a submitted query results in the identification of four stored queries that are most similar to the submitted query, the sets of refinement links associated with each stored query may contain different search categories and subcategories. From this combination of search categories and subcategories, a subset of this group may be selected and may subsequently be presented to the user in response to the submitted query.

While many embodiments of the present invention provide for a set of suggested refinement links to be determined by accessing a database, locating a stored query that is most similar to the submitted query, and from there, identifying the set of suggested refinement links that is associated with the stored query, the set of suggested refinement links may be determined in other ways. For example, instead of having a database with stored queries, a search engine may make the determination as to the most relevant search categories and subcategories only after the query has been submitted by the user. More specifically, there may not be a database having stored queries and sets of suggested refinement links that have already been determined to be relevant to the submitted query. Rather, the relevancy of search categories and subcategories may not be determined until the query has been submitted. It is contemplated that the methods discussed herein, as well as other methods used to determine relevance, and the timing of the relevancy determination, are all within the scope of the present invention.

In accordance with one embodiment of the present invention, a query may be submitted to a general web search page, which provides a broad-based search, or a "horizontal" search. Horizontal searches provide a breadth of information related to the search query, and generally return very large numbers of documents. The results may belong to a variety of categories, or verticals. Broad-based searches are typically used when a user does not want to limit the search to a specific search category or vertical. It should be noted that queries may be entered on a web page that may not qualify as a search page, but may be, in some instances, a news page, or any other type of web page that allows for a search to be performed. A toolbar, for example, may be located somewhere on a user's display device while the user is browsing various web pages, and the user may be able to enter a query in a search box located on the toolbar at anytime, and may be directed to a search engine for the presentation of search results.

In accordance with another embodiment of the present invention, a user may submit a query on a search page specific to a certain search category, which may be termed a vertical search. A vertical search may use an index that contains information solely on a specific search category, such as images, videos, products, job/careers, travel, local, research, real estate, automobile, etc. Typically, vertical search engines maintain a database containing information relating to the particular topic of the vertical, and may be most valuable to users who are interested in a particular specialized topic, which may include any of the examples provided herein (e.g., local, travel sites, business channels). For exemplary purposes only, a user may first arrive at a general web search page, such as those employed by MSN, Google, or Yahoo. In addition to search engines such as these whose primary purpose is to perform searches for a specialized area, a user may also select a specific search category or vertical prior to performing a search, and thus may perform a vertical search, which may return much more refined search results compared to those returned in response to a query submitted on a general web search page.

In one aspect, a computer-implemented method for determining relevant search categories and associated subcategories based on a query provided by a user, and displaying the relevant search categories and associated subcategories on an initial search results page after the query has been processed is provided. The method includes receiving a user inputted query and determining a set of suggested refinement links that includes one or more search categories and one or more subcategories that are algorithmically determined to be relevant to the user inputted query. The one or more subcategories, if selected, may provide more refined search results than a selection of the one or more search categories. The method further includes generating the initial search results page that includes search results and at least a portion of the set of suggested refinement links.

In another aspect, one or more computer-readable media having computer-useable instructions embodied thereon for performing a method of determining search categories and associated subcategories that are relevant to a query provided by a user and displaying the relevant search categories and associated subcategories on an initial search results page is provided. The method includes receiving the query provided by the user, and normalizing the query such that the query is transformed into a standardized format. Further, the method includes accessing a database to locate a stored query that is most similar to the normalized query and identifying from the database the set of suggested refinement links associated with the stored query. The set of suggested refinement links may include one or more search categories and one or more subcategories that are algorithmically determined to be relevant to the stored query. The one or more subcategories, if selected, may provide search results that are more refined than a selection of the one or more search categories. The method additionally includes communicating for presentation on the initial search results page the search results and at least a portion of the set of suggested refinement links.

In yet another aspect, one or more computer-readable media having computer-useable instructions embodied thereon for performing a method of determining search categories and associated subcategories that are relevant to a query provided by a user and displaying the relevant search categories and associated subcategories on an initial search results page is provided. The method includes receiving the query inputted by a user on a search page, and upon determining that the query requires normalization, normalizing the query into a standard format. Normalizing the query may include one or more of depluralizing any pluralized words, removing unnecessary words, sorting the words into a standard order, determining equivalent words, or determining alternate query formulations. The method further includes accessing a database containing a plurality of stored queries and a set of suggested refinement links associated with each of the stored queries to determine one of the plurality of stored queries that is most similar to the received query. The set of suggested refinement links may include one or more search categories, and each of the one or more search categories may have a corresponding group of one or more subcategories that, when selected by a user, provide narrower search results than a selection of the one or more search categories. Further, the associated sets of suggested refinement links may be algorithmically determined to be relevant to the stored queries. Additionally, the method includes identifying from the database the set of suggested refinement links associated with the stored query that is determined to be the most similar to the received query and generating the initial search results page that includes the search results and at least a portion of the set of suggested refinement links.

Having briefly described an overview of exemplary embodiments of the present invention, an exemplary operating environment for the present invention is now described. Referring to the drawings in general, and initially to FIG. 1 in particular, an exemplary operating environment for implementing embodiments of the present invention is shown and designated generally as computing device 100. Computing device 100 is but one example of a suitable computing environment and is not intended to suggest any limitation as to the scope of use or functionality of the invention. Neither should the computing environment 100 be interpreted as having any dependency or requirement relating to any one or combination of components/modules illustrated.

The invention may be described in the general context of computer code or machine-useable instructions, including computer-executable instructions such as program components, being executed by a computer or other machine, such as a personal data assistant or other handheld device. Generally, program components including routines, programs, objects, components, data structures, and the like, refer to code that performs particular tasks, or implements particular abstract data types. Embodiments of the present invention may be practiced in a variety of system configurations, including handheld devices, consumer electronics, general-purpose computers, specialty computing devices, etc. Embodiments of the invention may also be practiced in distributed computing environments where tasks are performed by remote-processing devices that are linked through a communications network.

Figure 1:
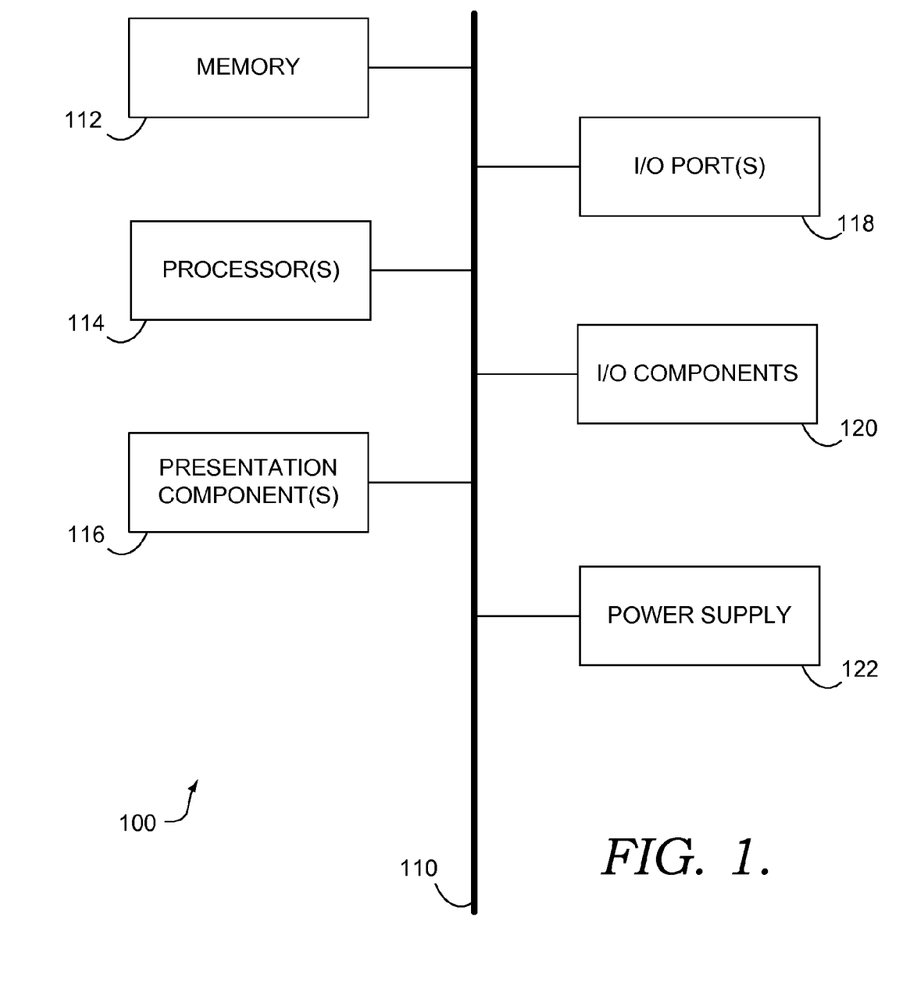
FIG. 1 is a block diagram of an exemplary computing environment suitable for use in implementing the present invention.

With continued reference to FIG. 1, computing device 100 includes a bus 110 that directly or indirectly couples the following devices: memory 112, one or more processors 114, one or more presentation components 116, input/output (I/O) ports 118, I/O components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display to be an I/O component. Also, processors have memory. The inventors hereof recognize that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "handheld device," etc., as all are contemplated within the scope of FIG. 1 and reference to "computer" or "computing device."

Computer 100 typically includes a variety of computer-readable media. Computer-readable media can be any available media that can be accessed by computer 100 and includes both volatile and nonvolatile media, removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 100.

Memory 112 includes computer-storage media in the form of volatile and/or nonvolatile memory. The memory may be removable, non-removable, or a combination thereof. Exemplary hardware devices include solid-state memory, hard drives, optical-disc drives, etc. Computing device 100 includes one or more processors that read data from various entities such as memory 112 or I/O components 120. Presentation component(s) 116 present data indications to a user or other device. Exemplary presentation components include a display, speaker, printing component, vibrating component, etc.

I/O ports 118 allow computing device 100 to be logically coupled to other devices, including I/O components 120, some of which may be built in. Illustrative components include a microphone, joystick, game pad, satellite dish, scanner, printer, wireless device, etc.

Figure 2:
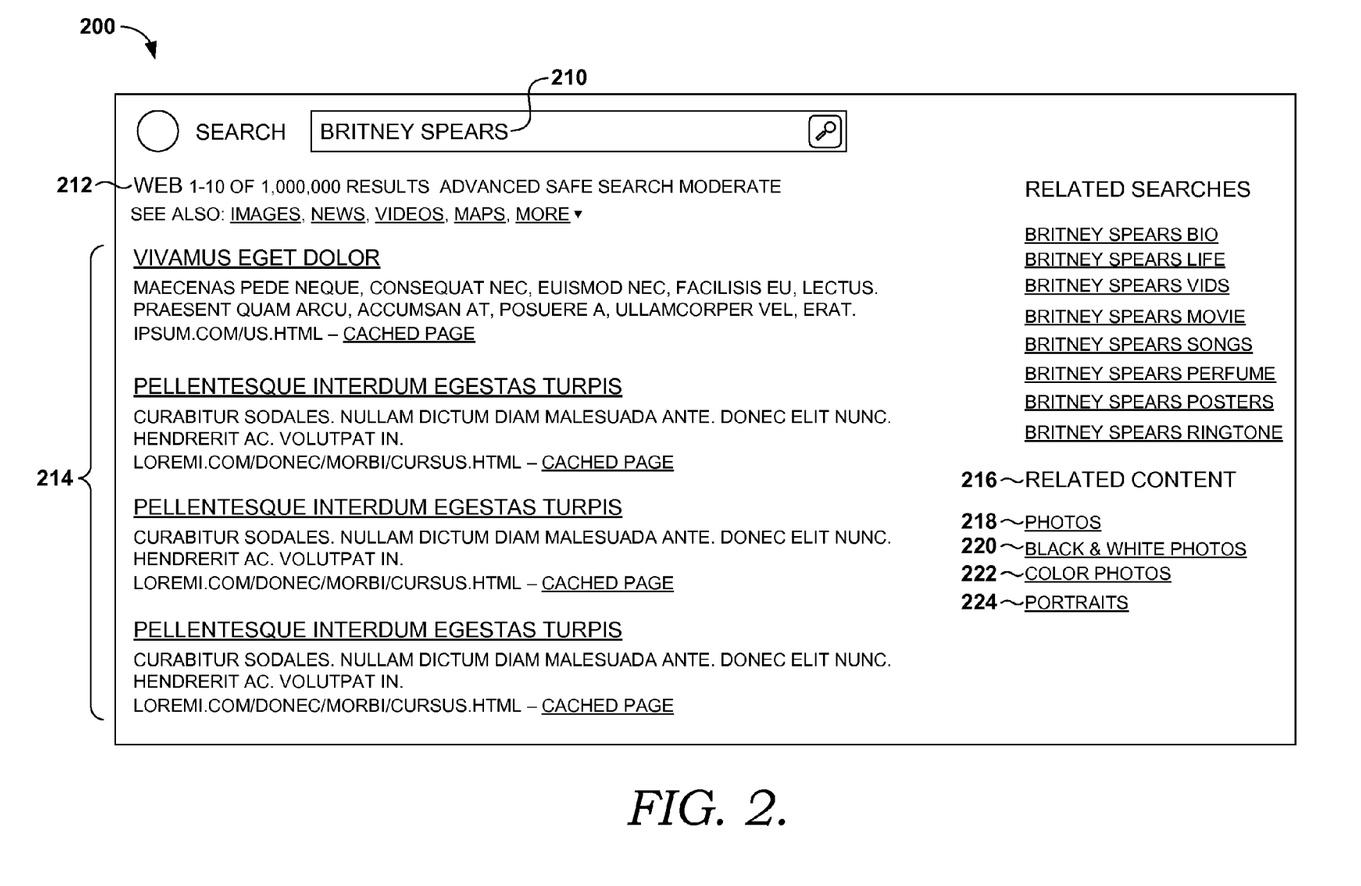
FIG. 2 is an illustrative screen display of an exemplary initial search results page showing search results and a plurality of subcategories displayed in response to a user inputted query, in accordance with an embodiment of the present invention.

Referring now to FIG. 2, an illustrative screen display of an exemplary initial search results page 200 is shown having search results and a plurality of subcategories displayed in response to a user inputted query, in accordance with an embodiment of the present invention. Initially, a user may enter a query in a search box 210. The query may be entered on many types of search pages, such as a general web search page 212 as shown in FIG. 2. Other search pages are shown and described below. A general web search page, such as 212, may not be specified to a certain search category, but may search for relevant search results throughout a variety of different search categories, such as images, news, health, maps, videos, products, and the like. As shown, the query has been submitted and processed, and in response, search results 214 have been communicated to be presented on a user's display device. It should be noted that although it has been described herein that a query is entered in a search box, such as search box 210 on a web search page, a user may be able to enter a query in another box, such as a search toolbar, for example. Search toolbars may be displayed even when the web page currently being displayed is not a search page. One of ordinary skill will appreciate that queries may be entered into any location that allows for the submission of queries, and that queries may be entered on pages that are not specifically search pages.

In addition to the search results 214, related content 216 may also be displayed on the initial search results page 200. The related content 216 may include one or more search categories, and one or more subcategories associated with the search categories, all which have been algorithmically determined to be relevant to the query entered into the search box 210. Here, the query is "Britney Spears," and it has been determined that subcategories photos 218, black and white photos 220, color photos 222, and portraits 224 are particularly relevant to the query "Britney Spears." Generally, a subcategory is associated with a search category in that if a user selects a subcategory, the returned search results are more narrow or more refined than if a user selects a search category. A subcategory may be within the broad scope of a search category. A search category may contain one or more subcategories. As previously mentioned, in the embodiment of FIG. 2, it has been found that photos 218, black and white photos 220, color photos 222, and portraits 224 are particularly relevant to the query "Britney Spears."

In another embodiment, if a search category is images, subcategories of images size (e.g., small, medium, large, desktop), aspect ratio (e.g., square, wide, tall), color (e.g., color, black and white), style (e.g., photograph, illustration), or face (e.g., face, head and shoulders). In yet another illustrative embodiment, a search category may be news, and a user may be able to refine the search by location, category, or blogs. Again, the search categories and subcategories that may be presented to a user for selection may only be those that have been determined to be relevant to the particular query. In addition, these search categories and subcategories may be presented on an initial search results page to allow the user to select a refined subcategory at the early stage of when the initial search results are provided, instead of having a user first perform a web search, then selecting a search category on a different results page, and then selecting a subcategory on still a different results page.

The determination as to how search categories and associated subcategories are related to a particular query may be made in many ways. One such way is by using a frequency or probability of other users selecting particular search categories and subcategories after having submitted the same or a similar query. For example, if "John McCain" is a query submitted on a general web search page, the search categories news, image, and video may be displayed on an initial search results page, in addition to one or more subcategories of those search categories, such as, for instance, news clips, location, portraits, photos, etc. In one embodiment, once a query is submitted, a lookup is performed of the submitted query in a database. The database may contain a plurality of queries, which may be in a normalized format, and may also contain one or more search categories and one or more subcategories that are relevant to the query, as described above.

With continued reference to FIG. 2, normalizing a query may include one or more steps in order to transform the query from the format submitted by the user into a standardized format so that there is a better chance of the query matching a query stored in the database. For example, normalizing the query may include one or more of: depluralizing any pluralized words, removing unnecessary words, sorting the words into a standard order, determining equivalent words, or determining alternate query formulations. Normalizing a query may also include relaxing certain terms in a query, or in some cases, matching a query with a stored query that may not be the best match, such as where there is a lower degree of confidence that any of the stored queries in the database are good matches, but a stored query may be similar or relevant to the query in some way.

Figure 3:
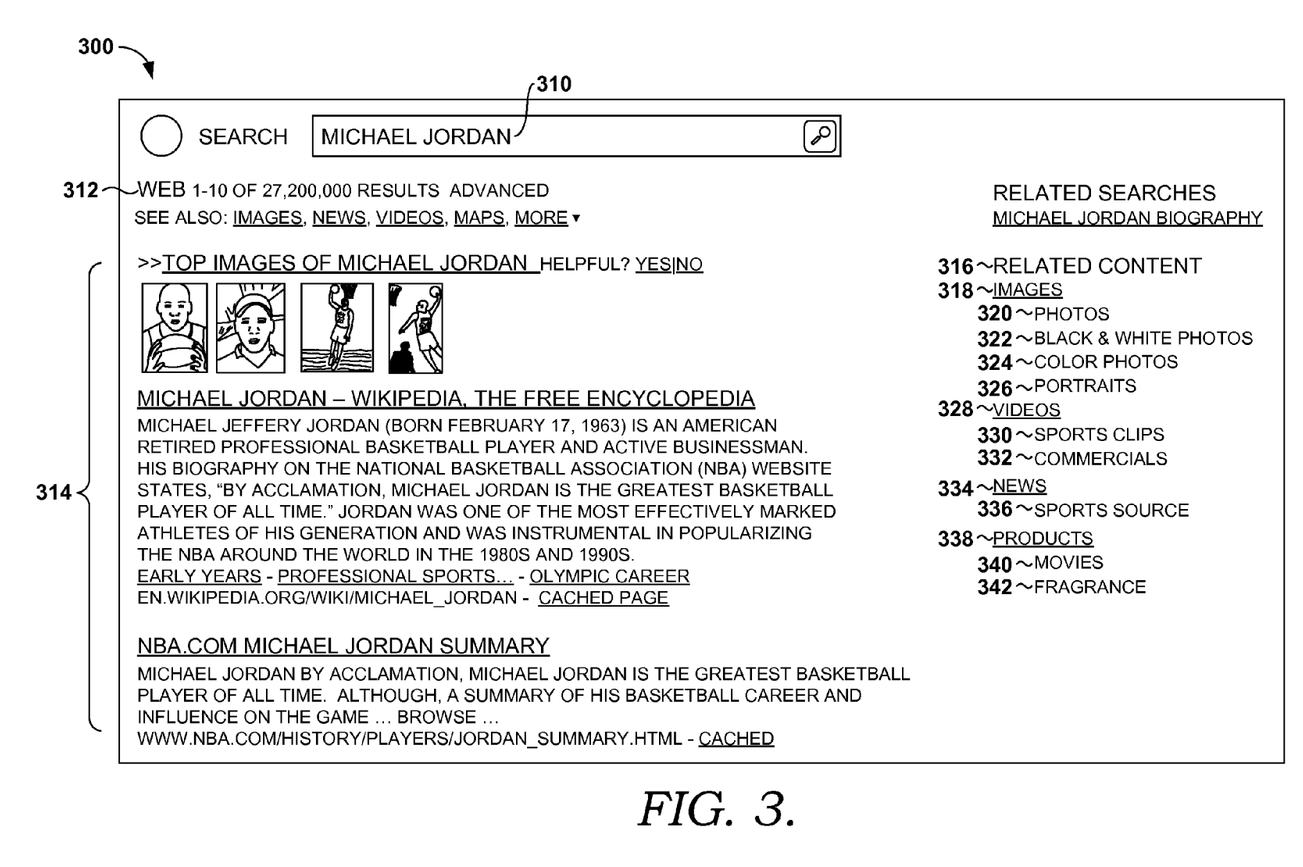
FIG. 3 is an illustrative screen display of an exemplary initial search results page showing search results and a plurality of search categories and subcategories displayed in response to a user inputted query, in accordance with an embodiment of the present invention.

FIG. 3 is an illustrative screen display of an exemplary initial search results page 300 showing search results and a plurality of search categories and subcategories displayed in response to a user inputted query, in accordance with an embodiment of the present invention. Here, a search box 310 is shown, and a user has entered a query on a general web search page, shown at 312. As shown, the query has been submitted, and search results 314 have been communicated for presentation on the user's display device, for example. FIG. 3 illustrates an embodiment having multiple search categories and associated subcategories being displayed as a result of a determination that these particular search categories and associated subcategories are relevant to the query that has been submitted. Here, related content 316 includes the search categories of images 318, videos 328, news 334, and products 338.

The search categories and subcategories shown in FIG. 3 are illustrated for exemplary purposes only. In other embodiments, other combinations of search categories and subcategories may be determined to be the most relevant for the same query. These examples are provided for illustrative purposes only, and one of ordinary skill in the art will appreciate that other combinations that comprise the set of suggested refinement links are certainly possible. In the embodiment of FIG. 3, the search categories shown may have been determined to be the most relevant search categories for the query "Michael Jordon." The search category images 318 includes various subcategories, such as photos 320, black and white photos 322, color photos 324, and portraits 326. The search category videos 328 includes the subcategories sports clips 330 and commercials 332, which may also have been determined to be most relevant to a query of "Michael Jordon." The search category news 334 includes the subcategory of sports sources 336, and the products 338 search category includes both movies 340 and fragrance 342 as subcategories.

Figure 4:
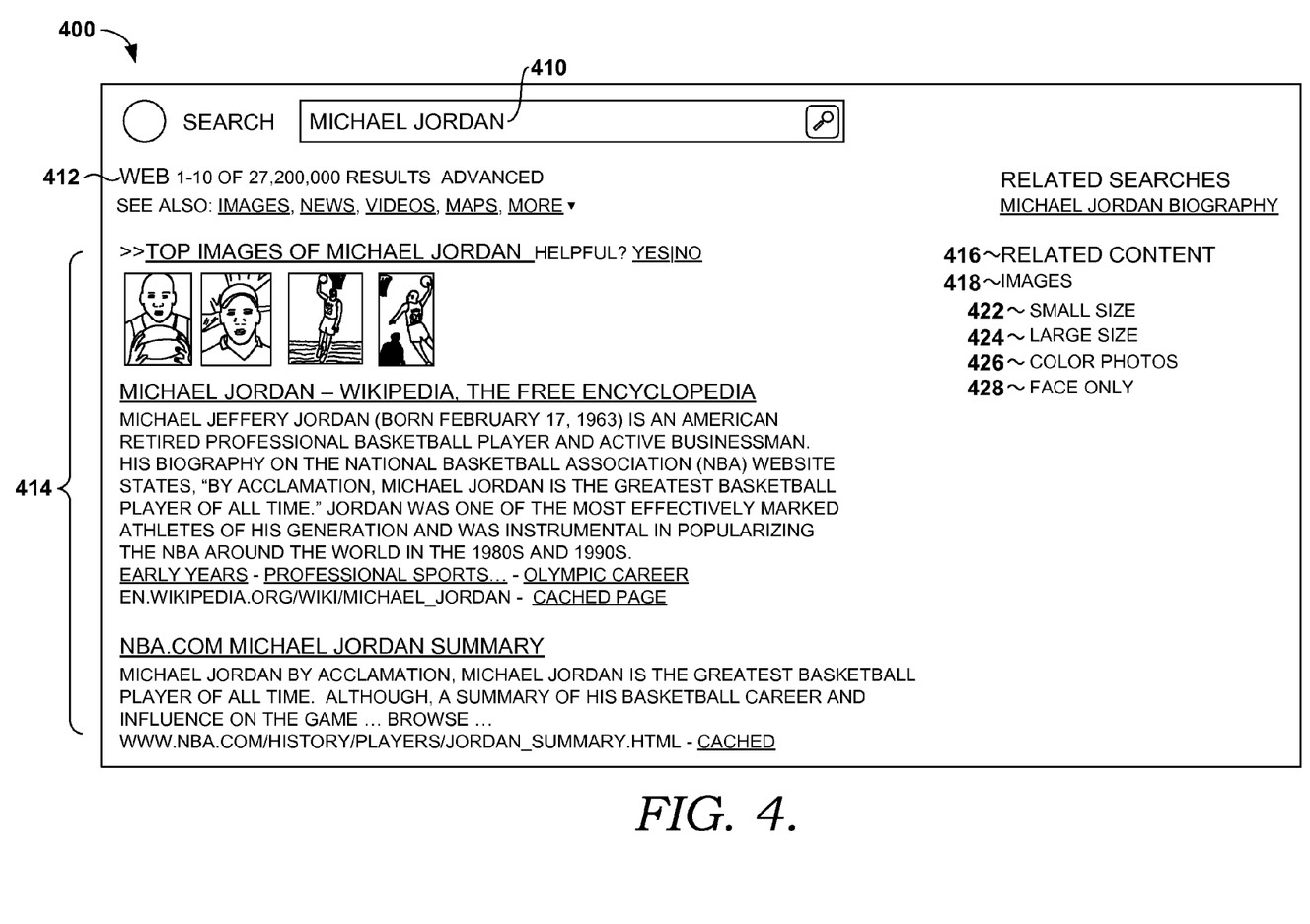
FIG. 4 is an illustrative screen display of an exemplary initial search results page showing search results and a search category and associated subcategories displayed in response to a user inputted query, in accordance with an embodiment of the present invention.

Turning now to FIG. 4, an illustrative screen display of an exemplary initial search results page 400 is shown having search results and a search category and associated subcategories displayed in response to a user inputted query, in accordance with an embodiment of the present invention. Initially, a search box 410 is illustrated including a query of "Michael Jordon" that has been entered and submitted by a user. The user has performed this search on a general web 412 search page, and as a result, a plurality of general web search results 414 have been returned. Once the query was submitted, a set of suggested refinement links were returned after a lookup of that query in a database, for example. The related content 416 (e.g., set of suggested refinement links) includes an images 418 search category and a plurality of subcategories, as shown here. The subcategories include, for example, small size images 422, large size images 424, color photos 426, and face only images 428. As briefly described above and as will be described more thoroughly below, these subcategories may have been identified as popular subcategories for the query by, for instance, determining that the subcategories have been selected more times than others by previous users who have submitted the same or a similar query.

Figure 5:
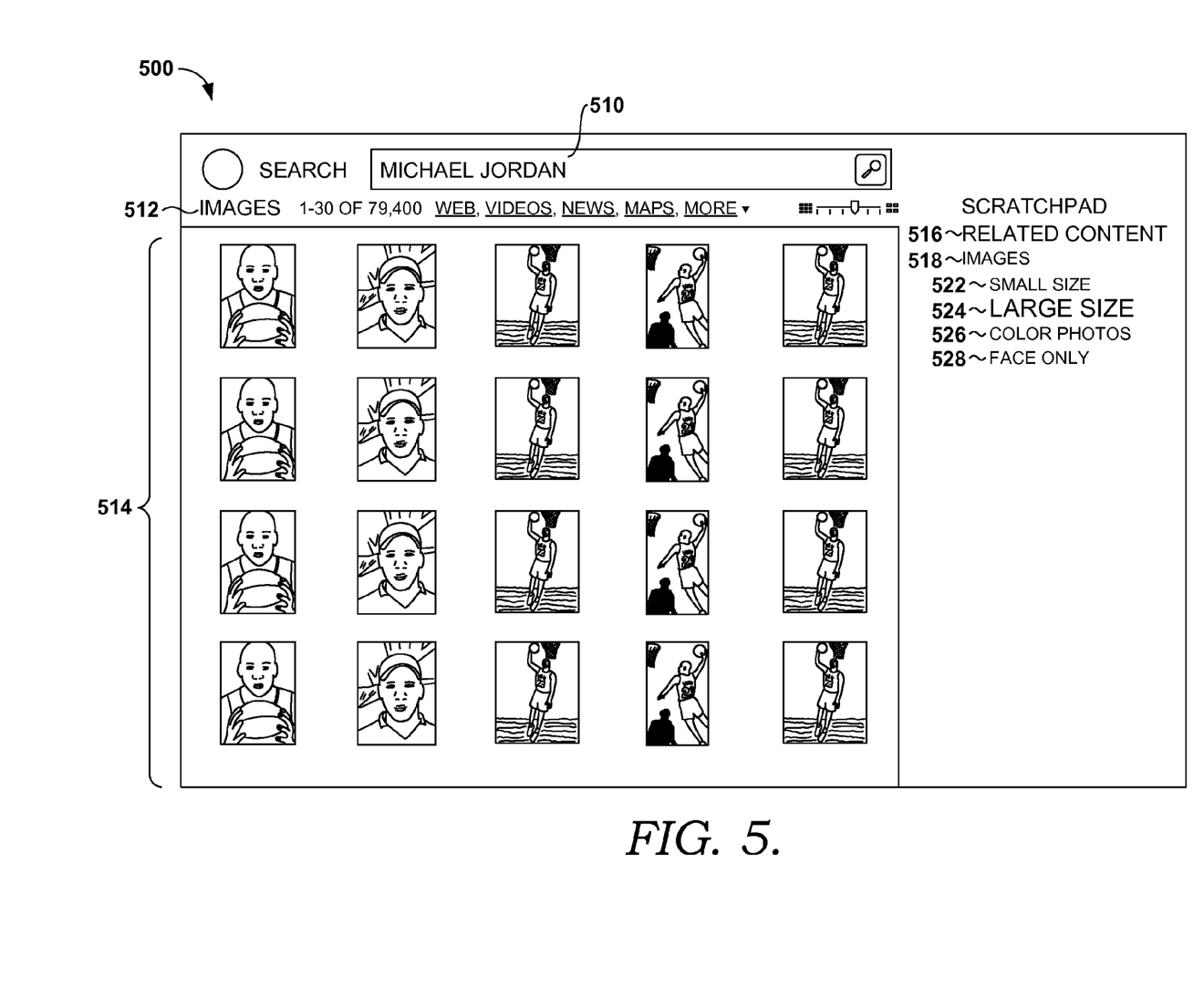
FIG. 5 is an illustrative screen display of an exemplary search results page for an images search category displayed as a result of a user selection on an initial search results page of a subcategory, in accordance with an embodiment of the present invention.

FIG. 5 illustrates a screen display of an exemplary search results page 500 for an images search category displayed as a result of a user selection on an initial search results page of a particular subcategory, in accordance with an embodiment of the present invention. FIG. 5 illustrates a search results page 500 of large size only images, as a result of a user selecting the large size subcategory (item 424 of FIG. 4) on the previous search results page. It should be noted that the search box 510 still displays "Michael Jordon" as the query. The user is taken directly to a results page having only large size images, as shown here. The user may still choose to refine in a different manner and may have the same options as were presented on the previous page, or the initial search results page. For example, the search category images 518 and subcategories small size 522, large size 524, color photos 526, and face only 528 are still shown, as they were the search category and subcategories determined to be the most relevant to the query "Michael Jordan," which had been previously submitted.

Figure 6:
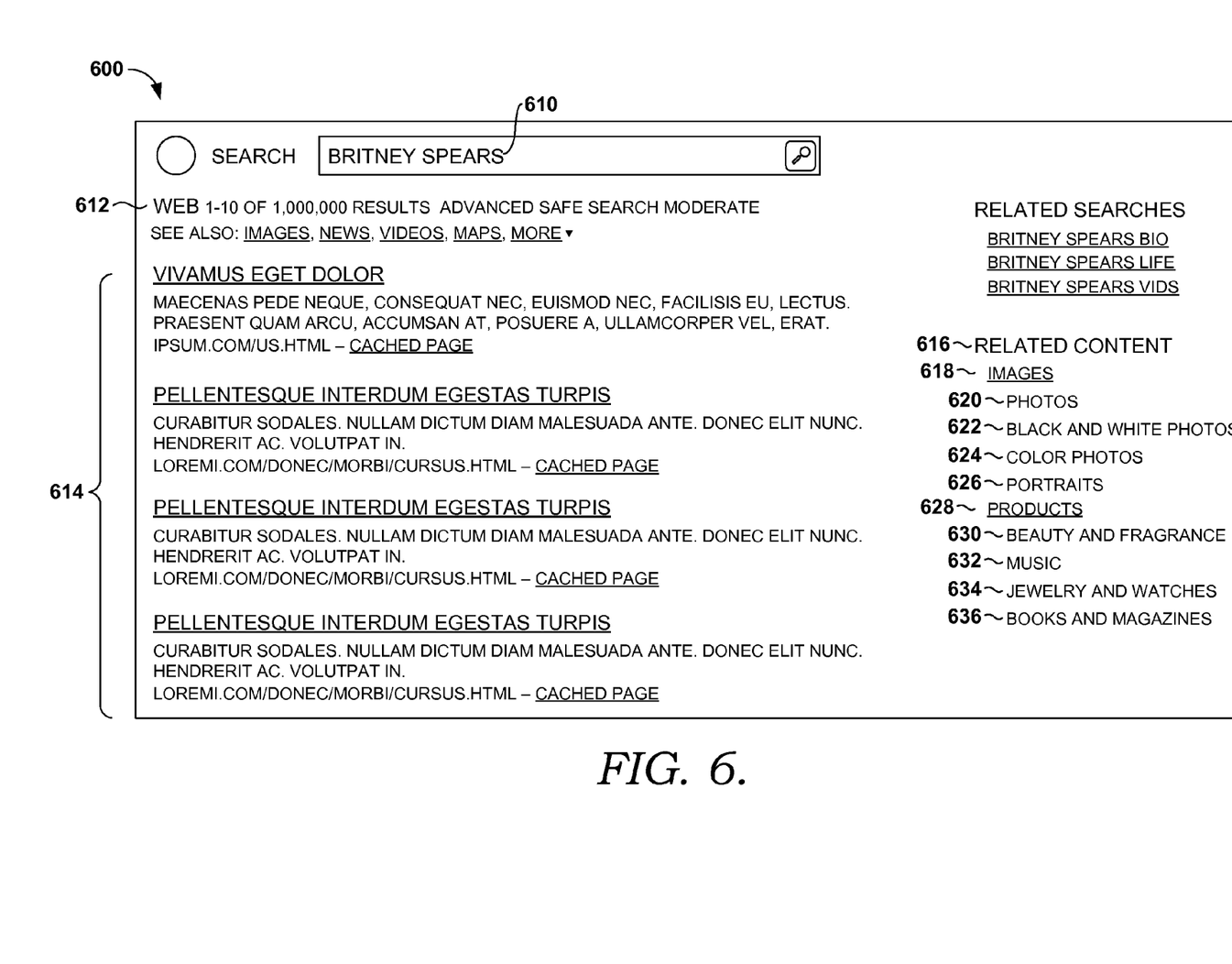
FIG. 6 is an illustrative screen display of an exemplary initial search results page showing search results and a plurality of subcategories of an image search category and a products search category displayed in response to a user inputted query, in accordance with an embodiment of the present invention.

Referring to FIG. 6, an illustrative screen display of an exemplary initial search results page 600 is shown having search results and subcategories of an image search category and a products search category displayed in response to a user inputted query, in accordance with an embodiment of the present invention. Initially, a search box 610 is shown on a general web search page 612. As a result of the submitted query "Britney Spears," search results 614 are displayed. Further, a set of suggested refinement links have been determined to be particularly relevant to the issued or submitted query. For exemplary purposes only and without limitation, the related content 616 includes the search categories images 618 and products 628. Subcategories of images 618 include photos 620, black and white photos 622, color photos 624, and portraits 626. Subcategories of products 628 include beauty and fragrance 630, music 632, jewelry and watches 634, and books and magazines 636. As mentioned above, there are a variety of ways in which the search categories and subcategories may be determined to be relevant to a particular query, including, for example, using a predetermined relevance of various search categories and subcategories to a particular query.

Figure 7:
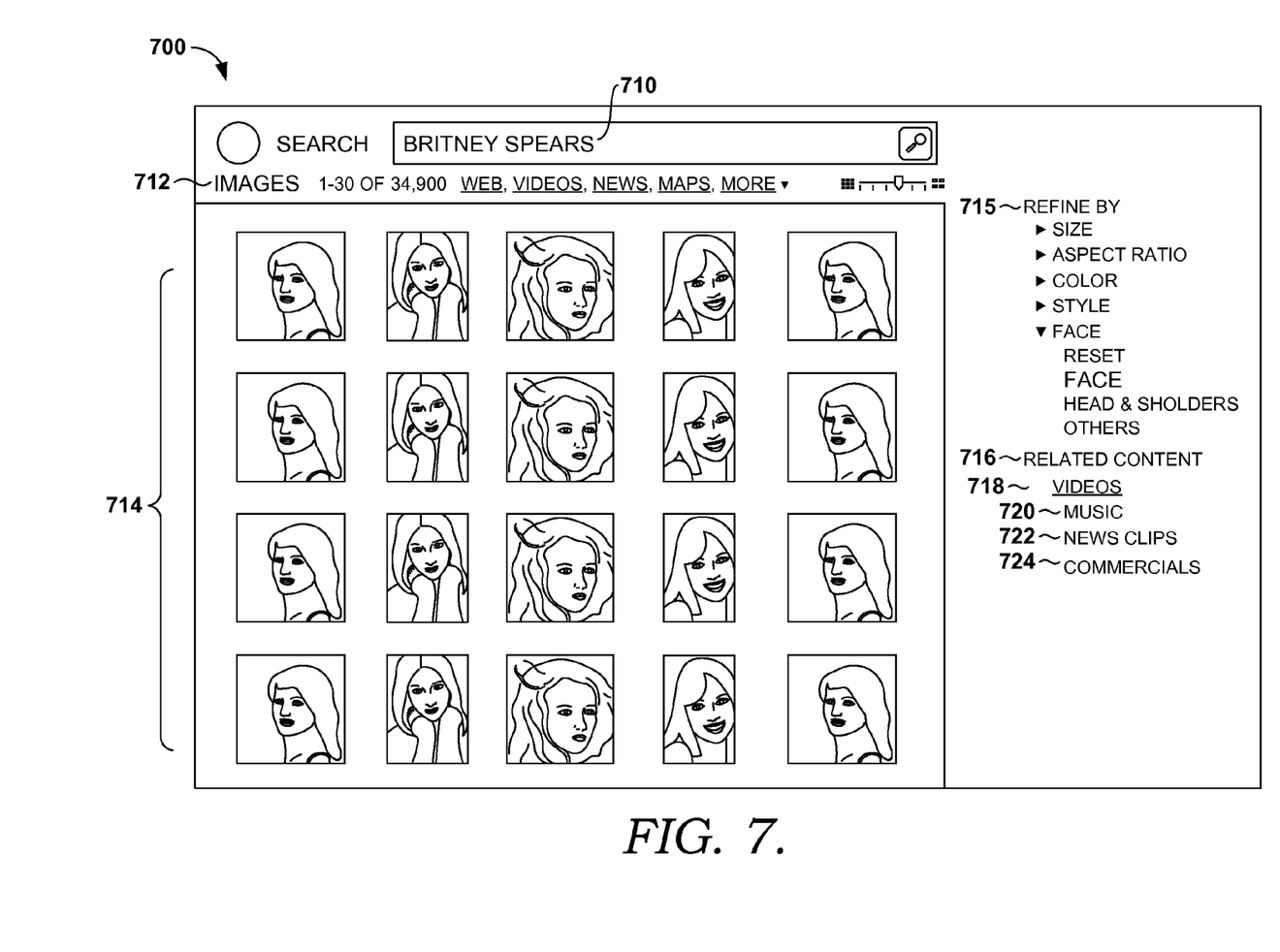
FIG. 7 is an illustrative screen display of an exemplary initial search results page for an images search category showing a search category and associated subcategories determined to be relevant to the query, in accordance with an embodiment of the present invention.

FIG. 7 is an illustrative screen display of an exemplary initial search results page 700 for an images search category showing a search category and associated subcategories determined to be relevant to the query. Here, a user may have first selected a particular search category for which to search for a query in a search box 710, such as an images search page 712. As a result, search results 714 (e.g., images) have been returned that are relevant to the query. An initial search results page is shown, as it is the first page having results after the query was submitted. In addition to refine by options 715, related content 716 may also be returned. This related content 716, in some instances, may be determined by performing a lookup in a database for a normalized form of the query entered by the user. Each stored query has a set of suggested refinement links associated with it, which may have been algorithmically determined to be relevant to the stored query. This may have been done through determining a relevance score of search categories and subcategories to the query, by a probability factor that a particular search category or subcategory will be selected by a user, or the like. As described herein, there are many methods for determining the set of suggested refinement links for each stored query.

Continuing with FIG. 7, the related content 716 includes a search category of video 718. As mentioned above, a lookup may have been performed, and it may have been determined that videos 718 and in particular, certain subcategories are relevant to the query "Britney Spears." Here, the subcategories include music 710, news clips 722, and commercials 724. Although the embodiment of FIG. 7 includes one search category and three subcategories, it is contemplated to be within the scope of the present invention that any number of search categories and subcategories may be determined to be relevant to a particular query (e.g., normalized form of a query). Further, the relevancies of particular search categories and subcategories may be dynamically determined, and may vary from day to day, week to week, year to year, etc.

Figure 8:
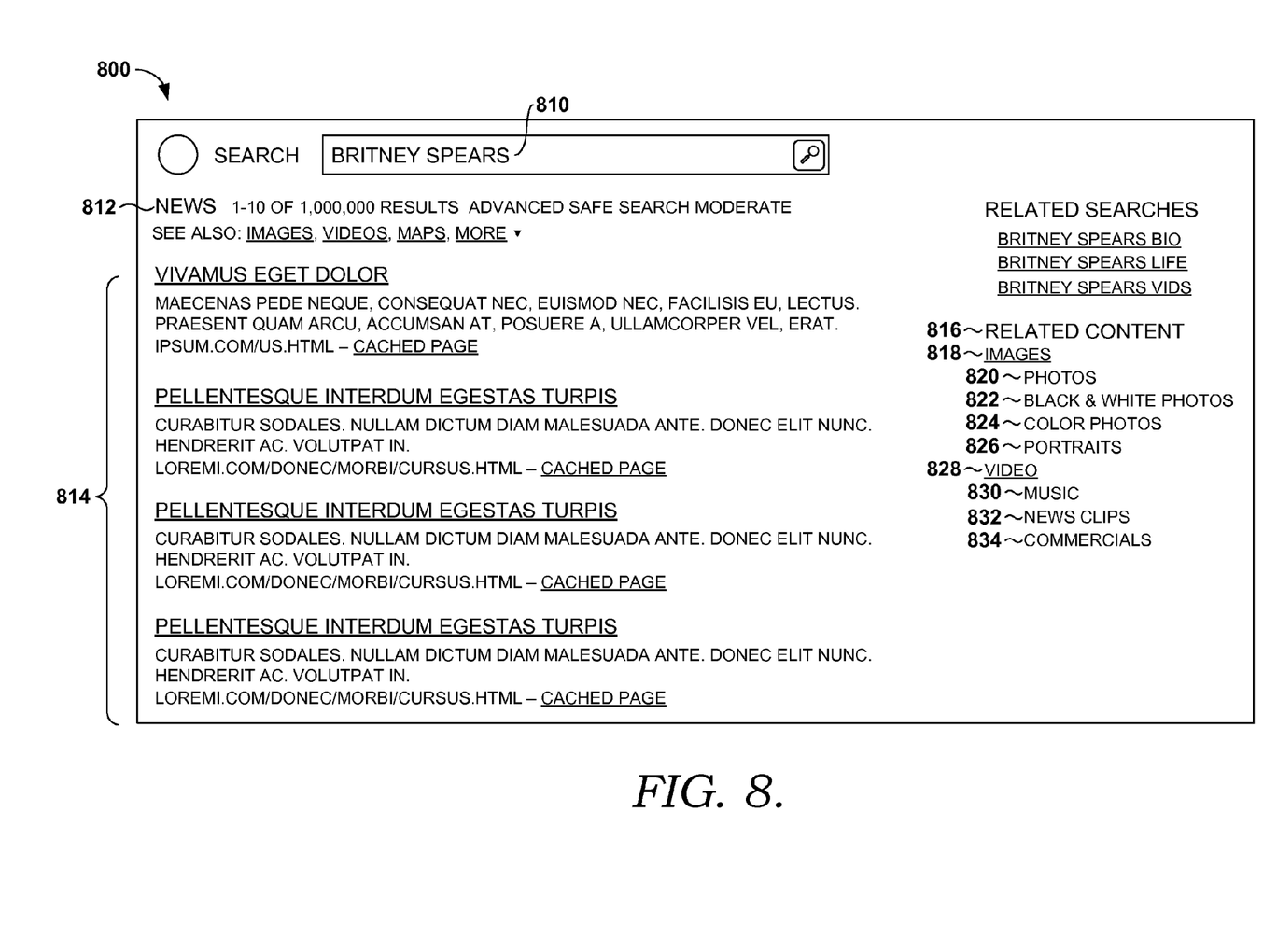
FIG. 8 is an illustrative screen display of an exemplary search page for a news search category showing search results and a plurality of other search categories and subcategories displayed in response to a user inputted query on the news search page, in accordance with an embodiment of the present invention.

Turning now to FIG. 8, an illustrative screen display of an exemplary search page 800 for a news search category showing search results and a plurality of other search categories and subcategories displayed in response to a user inputted query on the news search page, in accordance with an embodiment of the present invention. Initially, a user may have submitted a query "Britney Spears" into a search box 810 and may have initiated this search on a news search page 812. As a result, a plurality of search results 814 are returned. In addition to the search results 814, which, here, are all news related, a plurality of related content 816 (e.g., a set of suggested refinement links) may also be returned that have been determined to be relevant to the query. For example, it may have been determined that images 818 and videos 828 are particularly relevant to the query "Britney Spears."

As mentioned, this relevancy may be determined in a number of ways, including performing a lookup in a database for a normalized version of the user inputted query and from the stored query that best matches the normalized query, identifying a set of suggested refinement links that are associated with the stored query. This association may have been algorithmically determined by, for example, determining a relevancy of particular search categories and subcategories to the stored queries.

With continued reference to FIG. 8, the related content 816, or the set of suggested refinement links, include the search categories images 818 and videos 828. Subcategories of images 818 may include, for example, photos 820, black and white photos 822, color photos 824, and portraits 826. The subcategories of videos 828 may include, for instance, music 830, news clips 832, and commercials 834.

Figure 9:
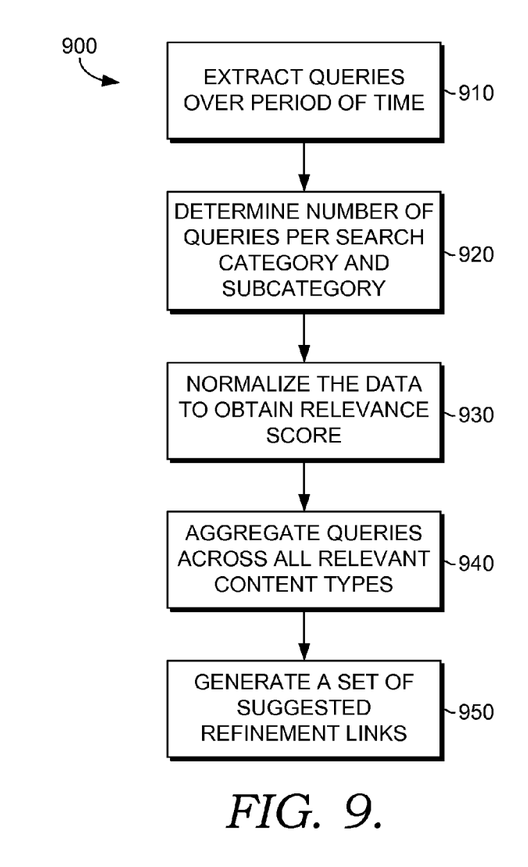
FIG. 9 is a flow diagram of a method for algorithmically determining that a set of suggested refinement links is relevant to a query, in accordance with an embodiment of the present invention.

FIG. 9 illustrates a flow diagram of a method 900 for algorithmically determining that a set of suggested refinement links is relevant to a query. The set of suggested refinement links includes one or more search categories (e.g., images, videos, news, maps, health, products), and one or more subcategories. Utilizing this method, information as to which search categories and subcategories previous users have issued queries on may be recorded, and it may then be determined whether any results were sent to the user as a result of that query issued or submitted on a particular search category web page, or even a specific subcategory. Further, it may be determined whether and how many times these previous users actually selected the results, which allows for more relevant search categories and subcategories to be presented to a user.

As previously mentioned, each query stored in the database may have an associated set of suggested refinement links that allows suggested refinement links to be identified for a user's query when the user's query matches, or closely matches, a stored query. Initially, at step 910, queries are extracted over a certain time period, such as a week, a month, a year, or even multiple years. In some instances, the queries may be normalized and stored in a database. At step 920, the number of queries per content type, such as per search category or subcategory, is determined, and at step 930, this data that has been gathered is normalized to obtain a relevance score. Obtaining a relevance score may include a probability function that compares the proportion of queries issued on any particular search category or subcategory to a normalizing ground value. In one embodiment, a normalizing ground value may be the total number of queries that are issued across all search categories and subcategories. Further, obtaining a relevance score may include parsing certain queries issued on a particular search category or subcategory that did not produce any search results, as these instances may signify that the next user issuing that same or similar query may also not find search results for that particular search category or subcategory. The relevance score may allow for the comparison of the likely relevance of different search categories and subcategories to each other for a particular query.

Continuing with reference to FIG. 9, at step 940, the queries are aggregated across all relevant content types (e.g., search categories, subcategories), which, in some embodiments, provides a ranking for each search category and subcategory for a particular stored query. This allows for only the most relevant (i.e., highest ranked) search categories and subcategories to be included in the set of suggested refinement links associated with each query, thus providing a subsequent user only the most relevant selections. Lastly, at step 950, the set of suggested refinement links for each query stored in the database is generated, and subsequently stored in the database.

Figure 10:
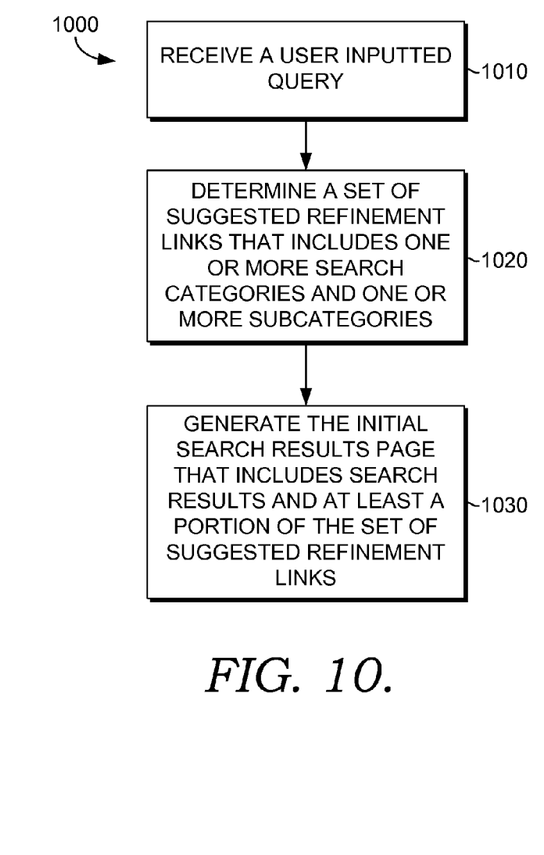
FIG. 10 is a flow diagram of a method for determining relevant search categories and associated subcategories based on a query provided by a user, and displaying the relevant search categories and associated subcategories on an initial search results page, in accordance with an embodiment of the present invention.

FIG. 10 illustrates a flow diagram of a method 1000 for determining relevant search categories and associated subcategories based on a query provided by a user, and displaying the relevant search categories and associated subcategories on an initial search results page, in accordance with an embodiment of the present invention. Initially, an initial search results page is the first page displayed after a query has been submitted, and typically includes one or more search results. Further, search categories are generally broader categories than subcategories, as each search category may include one or more subcategories that provide for a narrower search scope than the search category.

A user inputted query is received at step 1010. The query may be submitted by a user on a general web search page, or a search page specific to a particular search category, such as, but not limited to, images, videos, news, maps, products, health, or the like. A set of suggested refinement links is determined at step 1020. The set of suggested refinement links may include one or more search categories and one or more subcategories that are algorithmically determined to be relevant to the user inputted query. As previously described, subcategories are different from search categories in that when a user selects a specific subcategory, the search results returned are typically more refined than when a user selects a search category. Subcategories may further define certain aspects of a particular search category. As such, each subcategory may correspond to a search category.

Determining the set of suggested refinement links for the query may, in some embodiments, include normalizing the query into a standard format. This may involve, for example, one or more of depluralizing any pluralized words, removing unnecessary words, sorting the words into a standard order, determining equivalent words, determining alternate query formulations, etc. Next, a database may be accessed to determine a stored query that is most similar to the user inputted query. This may be done on a letter-by-letter basis, thus providing an efficient mechanism of matching a user inputted query, in a normalized or standard format, to a stored query, which also may be in a normalized or standard format. For example, the matching may not require every stored query to be searched, but will first locate stored queries starting with the first letter of the user inputted query, then limiting the results by searching the second letter, then the third letter, and so on. Once the stored query is determined or identified, the set of suggested refinement links associated with the stored query is also identified and may be the most relevant search categories and subcategories to the user inputted query. As mentioned, the set of suggested refinement links may be determined to be associated with a particular stored query by a frequency of previous users refining a search for the stored query, or a similar query, using search categories and subcategories. In addition to frequency, a method utilizing probability of a user selecting a certain search category or subcategory may also be used.

In one embodiment, more than one stored query may be determined to be the most similar to the user inputted query. As each stored query may have an associated set of suggested refinement links, and as each set of suggested refinement links may include different search categories and subcategories, a subset of these search categories and subcategories taken from the multiple sets of suggested refinement links may be selected to be displayed to the user in response to the user inputted query.

At step 1030, the initial search results page is generated, and may include search results and at least a portion of the set of suggested refinement links. If a user's query is submitted on a general web search page, the search results may be general, and may be related to various search categories, such as images, videos, news, etc. If a user's query, however, is submitted on a search page specific to a search category, the search results may also be specific to that search category. For example, if a user's query is submitted on an images search page, the search may be partially or entirely images relevant to the query. Further, as mentioned, at least a portion of the set of suggested refinement links may also be included on the initial search results page. The number of search categories and subcategories that are displayed on an initial search results page may be predetermined. In one embodiment, no more than this predetermined number are included in the set of suggested refinement links. In another embodiment, any number of search categories and subcategories may be included in the set of suggested refinement links, but the number may be limited when displayed on the initial search results page.

Figure 11:
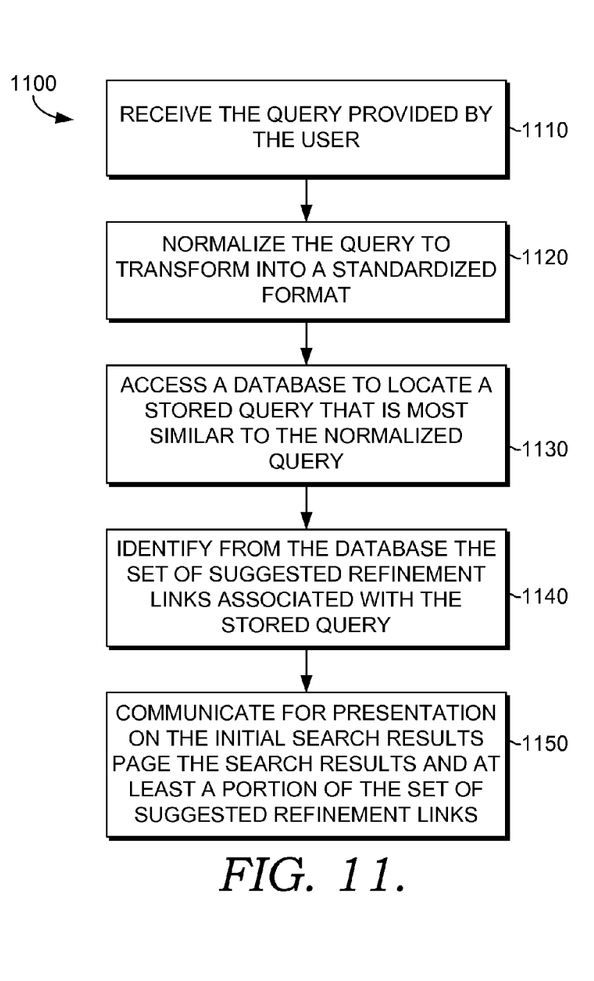
FIG. 11 is a flow diagram of a method for determining search categories and associated subcategories that are relevant to a query provided by a user and displaying the relevant search categories and associated subcategories on an initial search results page, in accordance with an embodiment of the present invention.

Referring now to FIG. 11, a flow diagram is illustrated of a method 1100 for determining search categories and associated subcategories that are relevant to a query provided by a user and displaying the relevant search categories and associated subcategories on an initial search results page, in accordance with an embodiment of the present invention. Initially, a query is received at step 1110, wherein the query may have been provided by a user. The query is normalized to transform it into a standardized, or normalized format at step 1120. As mentioned, normalizing a query may be done by any method, but may include, for instance, depluralizing any pluralized words, removing unnecessary words, sorting the words into a standard order, determining equivalent words, or determining alternate query formulations. Next, a database is accessed at step 1130 to locate a stored query that is most similar to the normalized query. As mentioned, this may be done on a letter-by-letter basis, which may be more efficient than searching through each stored query in the entire database.

A set of suggested refinement links is identified from the database at step 1140, wherein the set of suggested refinement links may be associated with the stored query identified at step 1130. The set of suggested refinement links may include one or more search categories and one or more subcategories that have been algorithmically determined to be relevant to the stored query. This may be determined by a frequency of previous users refining a search for the stored query, or for queries similar to the stored query, using the search categories and subcategories in the set of suggested refinement links. Further, the subcategories, when selected, may provide more refined or narrow search results than when a corresponding search category is selected.

With continued reference to FIG. 11, at step 1150, the search results and at least a portion of the set of suggested refinement links are communicated for presentation on the initial search results page. Whether or not a portion or the complete set of suggested refinement links are displayed may depend on whether there is a predetermined number of search categories and subcategories that may be included in the set of suggested refinement links, or whether there is a predetermined number of search categories and subcategories that may be displayed on an initial search results page. In one embodiment, if there are more search categories and subcategories in a set of suggested refinement links than may be displayed on an initial search results page, the number may be limited for display, and thus a portion of the set of suggested refinement links are included on the initial search results page. Further, in one embodiment, the set of suggested refinement links identified in the database as being associated with the stored query may be reformatted, or converted into a format so that the links may be presented on the initial search results page.

The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well-adapted to attain all the ends and objects set forth above, together with other advantages which are obvious and inherent to the methods. It will be understood that certain features and subcombinations are of utility and may be employed without reference to other features and subcombinations. This is contemplated by and is within the scope of the claims.

What is claimed is:

1. A computer-implemented method for determining relevant search categories and associated subcategories based on a query provided by a user, and displaying the relevant search categories and associated subcategories on an initial search results page after the query has been processed, the method comprising:
   receiving a user inputted query;
   determining a set of algorithmic search results that are algorithmically determined to be relevant to the user inputted query;
   accessing a database comprising a plurality of stored queries, each of the plurality of stored queries being associated with predetermined sets of search categories and correlated subcategories based on at least one of a frequency or a probability of previous users refining a search for the each of the stored queries using the predetermined sets of search categories and correlated subcategories;
   determining a stored query in the database that is similar to the user inputted query;
   identifying one or more predetermined search categories and one or more predetermined subcategories correlated with a corresponding search category of the one or more predetermined search categories that are associated in the database with the stored query, the one or more predetermined search categories and the one or more predetermined subcategories relevant to the user inputted query, wherein
      (1) each search category of the one or more predetermined search categories represents a vertical search category corresponding to a type of information, and wherein selection of the each search category provides a first set of search results corresponding to the type of information, and
      (2) each subcategory of the one or more predetermined subcategories represents a more refined type of information as compared to the each subcategory's correlated category, and wherein selection of the each subcategory provides a second set of search results corresponding to the more refined type of information; and
   generating the initial search results page, wherein the initial search results page is a first results page that is visible to the user after the user submits the query, the initial search results page comprising:
      (1) a first display area useable for presenting the set of algorithmic search results, and
      (2) a second display area useable for presenting a portion of the one or more predetermined search categories and the one or more predetermined subcategories, the second display area being displayed in a separate area than the first display area on the initial search results page.

2. The method of claim 1, wherein the user inputted query is entered on a general web search page.

3. The method of claim 1, wherein the user inputted query is entered on a web search page specific to a search category.

4. The method of claim 1, wherein identifying the one or more predetermined search categories and the one or more predetermined subcategories that are relevant to the user inputted query further comprises normalizing the user inputted query into a standard format.

5. The method of claim 4, wherein normalizing the user inputted query includes one or more of depluralizing any pluralized words, removing unnecessary words, sorting the words into a standard order, determining equivalent words, or determining alternate query formulations.

6. The method of claim 1, wherein the portion of the one or more predetermined search categories and the one or more predetermined subcategories are presented when the one or more predetermined search categories and the one or more predetermined subcategories for the user inputted query include more than a predetermined number of search categories and subcategories.

7. The method of claim 6, wherein more than the predetermined number of search categories and subcategories are included in the one or more predetermined search categories and the one or more predetermined subcategories.

8. One or more hardware storage devices having computer-useable instructions embodied thereon for performing a method of determining search categories and associated subcategories that are relevant to a query provided by a user and displaying the relevant search categories and associated subcategories on an initial search results page, the method comprising:
- receiving the query provided by the user;
- normalizing the query such that the query is transformed into a standardized format;
- accessing a database to locate a stored query that is similar to the normalized query, the database comprising a plurality of stored queries and sets of predetermined search categories and correlated subcategories associated with each of the stored queries based on at least one of a frequency or a probability of previous users refining a search for the each of the stored queries using the sets of predetermined search categories and correlated subcategories;
- identifying from the database:
  - (1) one or more predetermined search categories that are associated with the stored query, wherein each one of the one or more predetermined search categories represents a vertical search category corresponding to a type of information, and wherein selection of the each search category provides a first set of search results corresponding to the type of information, and
  - (2) one or more predetermined subcategories that are associated with the stored query, each subcategory of the one or more predetermined subcategories correlated with a corresponding category of the one or more predetermined categories, wherein each one of the one or more predetermined subcategories represents a more refined type of information as compared to the each subcategory's corresponding category, and wherein selection of the each predetermined subcategory provides a second set of search results corresponding to the more refined type of information;
- determining a set of algorithmic search results associated with the query received from the user;
- communicating for presentation on the initial search results page the algorithmic search results and at least a portion of the one or more predetermined search categories and the one or more predetermined subcategories, the at least a portion of the one or more predetermined search categories and the one or more predetermined subcategories being different from the set of algorithmic search results; and
- generating for display the initial search results page that includes the algorithmic search results and the at least a portion of the one or more predetermined search categories and the one or more predetermined subcategories, the at least a portion of the one or more predetermined search categories and the one or more predetermined subcategories being displayed differently than the algorithmic search results, wherein the initial search results page is a first results page that is visible to the user after the user submits the query.

9. The hardware storage devices of claim 8, wherein the query is entered on a general web search page.

10. The hardware storage devices of claim 8, wherein the query is entered on a web search page that is specific to a particular search category, wherein the particular search category is one of images, videos, maps, news, health, or products.

11. The hardware storage devices of claim 8, wherein there is a predetermined number of search categories and subcategories that are included in the one or more predetermined search categories and the one or more predetermined subcategories.

12. The hardware storage devices of claim 8, further comprising converting the one or more predetermined search categories and the one or more predetermined subcategories into a format so that they can be communicated for presentation on the initial search results page.

13. One or more hardware storage devices having computer-useable instructions embodied thereon for performing a method of determining search categories and associated subcategories that are relevant to a query provided by a user and displaying the relevant search categories and associated subcategories on an initial search results page, the method comprising:
- receiving the query inputted by a user on a search page;
- upon determining that the query requires normalization, normalizing the query into a standard format, wherein normalizing the query includes one or more of depluralizing any pluralized words, removing unnecessary words, sorting the words into a standard order, determining equivalent words, or determining alternate query formulations;
- accessing a database containing a plurality of stored queries and one or more predetermined search categories and one or more predetermined subcategories associated with each of the stored queries based on at least one of a frequency or a probability of previous users refining a search for the each of the stored queries using the one or more predetermined search categories and
- the one or more correlated predetermined subcategories to determine one of the plurality of stored queries that is similar to the received query, wherein:
  - (1) each one of the one or more predetermined search categories represents a vertical search category corresponding to a type of information, and wherein selection of the each category of the one or more predetermined search categories provides a first set of search results corresponding to the type of information, and
  - (2) each one of the one or more predetermined subcategories is associated with a corresponding category of the one or more predetermined categories, and wherein each one of the one or more predetermined subcategories represents a more refined type of information as compared to the each subcategory's corresponding category, and further wherein selection of the each subcategory of the one or more predetermined subcategories provides a second set of search results corresponding to the more refined type of information;
  - (3) generating for display the initial search results page that includes the algorithmic search results and a portion of the one or more predetermined search categories and the one or more predetermined subcategories, the algorithmic search results being displayed differently than the portion of the one or more predetermined search categories and the one or more predetermined subcategories, wherein the initial search results page is a first results page that is visible to the user after the user inputs the query;
- receiving a user selection of at least one of the predetermined search categories or at least one of the predetermined subcategories presented on the initial search results page;
- generating for display a second results page that comprises a new updated set of search results corresponding to the selected at least one of the predetermined search categories or the at least one of the predetermined subcategories; and persisting for display on the second results page the portion of the one or more predetermined search categories and the one or more predetermined subcategories in their entirety in the same viewable area.

14. The method of claim 1, wherein the one or more predetermined search categories and the one or more predetermined subcategories are associated with generic descriptors that describe a type of information associated with the respective one or more predetermined search categories and the one or more predetermined subcategories.

15. The method of claim 1, further comprising:

receiving a selection of at least one of the one or more predetermined search categories or at least one of the one or more predetermined subcategories on the initial search results page;

generating a second search results page comprising:
- (1) a first display area useable for presenting a new updated set of search results relevant to the selected at least one of the one or more predetermined search categories or the at least one of the one or more predetermined subcategories; and
- (2) a second display area useable for presenting the portion of the one or more predetermined search categories and the one or more predetermined subcategories in their entirety.

16. The method of claim 15, wherein the second display area on the second search results page is displayed in a separate area than the first display area on the second search results page.

* * * * *